United States Patent
Werner et al.

(10) Patent No.: US 10,892,469 B2
(45) Date of Patent: Jan. 12, 2021

(54) SAFETY COMPLIANT BATTERY CELL EJECTION FOR PACKAGED BATTERY CELLS

(71) Applicant: INTERNATIONAL BUSINESS MACHINES CORPORATION, Armonk, NY (US)

(72) Inventors: John S. Werner, Fishkill, NY (US); Noah Singer, New City, NY (US); Budy Notohardjono, Poughkeepsie, NY (US); Arkadiy O. Tsfasman, Wappingers Falls, NY (US); Mitchell Zapotoski, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 16/048,406

(22) Filed: Jul. 30, 2018

(65) Prior Publication Data
US 2020/0035981 A1   Jan. 30, 2020

(51) Int. Cl.
*H01M 2/34* (2006.01)
*H01M 2/10* (2006.01)
*H01M 10/0525* (2010.01)
*H01M 10/633* (2014.01)
*H01M 10/48* (2006.01)
(Continued)

(52) U.S. Cl.
CPC ......... *H01M 2/348* (2013.01); *H01M 2/1016* (2013.01); *H01M 10/0525* (2013.01); *H01M 10/4257* (2013.01); *H01M 10/486* (2013.01); *H01M 10/613* (2015.04); *H01M 10/633* (2015.04); *H01M 10/6563* (2015.04); *H01M 2010/4271* (2013.01); *H01M 2200/10* (2013.01)

(58) Field of Classification Search
CPC .. H01M 2/348; H01M 2/1016; H01M 10/613; H01M 10/633
See application file for complete search history.

(56) References Cited

U.S. PATENT DOCUMENTS

| 8,492,018 B2 | 7/2013 | Chen et al. |
| 8,541,126 B2 | 9/2013 | Hermann et al. |

(Continued)

FOREIGN PATENT DOCUMENTS

| CN | 104716289 A | * 6/2015 |
| EP | 2302727 A1 | 3/2011 |

OTHER PUBLICATIONS

Machine translation of CN104716289 (no date).*
(Continued)

*Primary Examiner* — Amanda C. Walke
(74) *Attorney, Agent, or Firm* — Tihon Poltavets

(57) ABSTRACT

An apparatus for containing packaged battery cells in an airflow environment that includes a battery cell package with a printed circuit board, a battery cell, and a containment compartment, where the battery cell is suspended from the printed circuit board in an inverted position. The battery cell is electrically and structurally coupled to the printed circuit board, wherein a solder connection electrically and structurally couples the battery cell and the printed circuit board. The apparatus further includes a cavity of the containment compartment disposed below the battery cell, wherein a volume of the cavity of the containment compartment is greater than a volume of the battery cell.

19 Claims, 11 Drawing Sheets

(51) Int. Cl.
    *H01M 10/42*     (2006.01)
    *H01M 10/613*     (2014.01)
    *H01M 10/6563*     (2014.01)

(56) References Cited

U.S. PATENT DOCUMENTS

| | | |
|---|---|---|
| 8,733,465 B1 | 5/2014 | Flood et al. |
| 9,324,980 B1 | 4/2016 | Goulden et al. |
| 9,379,419 B2 | 6/2016 | Krolak |
| 2002/0155348 A1 | 10/2002 | Gitto |
| 2005/0170238 A1 | 8/2005 | Abu-Isa et al. |
| 2005/0271934 A1 | 12/2005 | Kiger et al. |
| 2009/0014188 A1 | 1/2009 | Hesch et al. |
| 2009/0239132 A1 | 9/2009 | Johnson |
| 2010/0028758 A1 | 2/2010 | Eaves et al. |
| 2012/0079859 A1 | 4/2012 | Lakamraju et al. |
| 2012/0274140 A1* | 11/2012 | Ganor ............... H01M 10/4207 307/71 |
| 2013/0316198 A1 | 11/2013 | Bandhauer et al. |
| 2015/0056482 A1 | 2/2015 | Kyla-Kaila et al. |
| 2017/0033420 A1* | 2/2017 | Dudley ............. H01M 10/6557 |
| 2018/0048037 A1 | 2/2018 | Newman |
| 2020/0075926 A1* | 3/2020 | Torok ................... H05K 7/1427 |

OTHER PUBLICATIONS

Xu et al., "Prevent Thermal Runaway of Lithium-ion Batteries With Minichannel Cooling", Applied Thermal Engineering 110 (2017) pp. 883-890.

\* cited by examiner

SAFETY COMPLIANT BATTERY CELL EJECTION FOR PACKAGED BATTERY CELLS

FIELD OF THE INVENTION

This disclosure relates generally to packaging battery cells, and in particular, to structures for ejecting and containing individually packaged battery cells.

BACKGROUND OF THE INVENTION

High energy density batteries (e.g., lithium-ion batteries) have become the preferred battery technology for items such as consumer electronics, electric vehicles, battery backup systems, and systems requiring a mobile and rechargeable power source. A byproduct of high energy density is that lithium-ion batteries pose a greater safety risk than lower energy density technologies due to the amount of chemical energy stored in a small package. Lithium-ion batteries have the potential to experience an internal electrical short, which can result in thermal runaway and may ignite. A thermal runaway event in one battery may propagate across multiple lithium-ion batteries in a vicinity.

SUMMARY

One aspect of an embodiment of the present invention discloses an apparatus for containing packaged battery cells, the apparatus comprising a battery cell package includes a printed circuit board, a battery cell, and a containment compartment, wherein the battery cell is suspended from the printed circuit board in an inverted position. The battery cell is electrically and structurally coupled to the printed circuit board, wherein a solder connection electrically and structurally couples the battery cell and the printed circuit board. A cavity of the containment compartment is disposed below the battery cell, wherein a volume of the cavity of the containment compartment is greater than a volume of the battery cell.

A second aspect of an embodiment of the present invention discloses a method comprising querying one or more temperature sensors associated with a battery cell for one or more temperature values and/or querying one or more voltage sensors associated with a battery cell for one or more voltage values. Responsive to determining that the one or more temperature values do not exceed a threshold temperature value, determining, by one or more processors, whether at least one voltage value out of the one or more voltage values exceeds a threshold voltage value. Responsive to determining at least one temperature value out of the one or more temperature values exceeds the threshold temperature value and/or at least one voltage value out of the one or more voltage values exceeds the threshold voltage value, activating, by one or more processors, a heating pad associated with the battery cell, wherein the heating pad provides heat to an intumescent medium for ejecting the battery cell from a printed circuit board.

BRIEF DESCRIPTION OF THE SEVERAL VIEWS OF THE DRAWINGS

The following detailed description, given by way of example and not intended to limit the disclosure solely thereto, will best be appreciated in conjunction with the accompanying drawings, in which.

DETAILED DESCRIPTION

Figure 1:
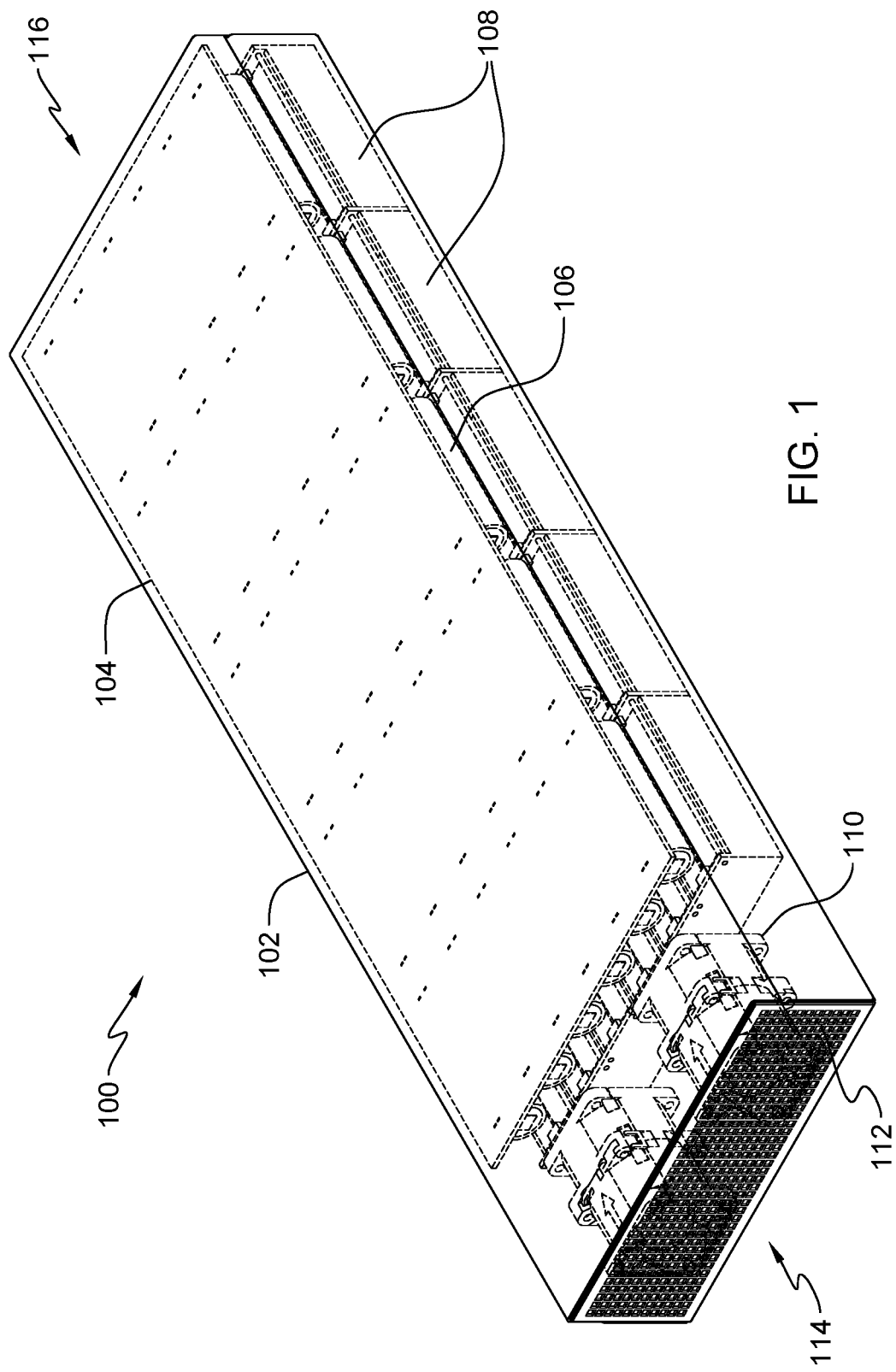
FIG. 1 depicts a battery cell circuit board assembly with containment compartments and cooling fans situated within an enclosure, in accordance with an embodiment of the present invention.

Embodiments of the present invention provide an apparatus for ejecting and containing battery cells experiencing a thermal event. The apparatus, for utilization in an airflow application, includes multiple battery cells, a printed circuit board (PCB), multiple containment compartments, one or more cooling fans, and a low temperature solder, where the multiple battery cells are mounted to the PCB utilizing the low temperature solder in an inverted position above the multiple containment compartments. Ideally, the low temperature solder is selected based on the solder turning liquidous from 100 Celsius to 200 Celsius (e.g., bismuth, tin, and silver based allows, indium, zinc). Typically, the structural integrity of the low temperature solder becomes compromised around 170 Celsius but a variation in structural integration is dependent on a weight of the battery cell and a type of low-temperature solder utilized for suspending the battery cell from the PCB in an inverted position. As the battery cell increases in temperature due to the thermal event, the low temperature solder begins turning liquidous and an electrical and structural connection between the PCB and the battery cell is broken. As the electrical and structural connection is broken, the battery cell is ejected into the containment compartment position below. The containment compartment isolates the ejected battery cell, preventing a cascading failure to battery cells in the vicinity. Additionally, a heating pad and/or intumescent material can be included between the battery cell and the PCB to further assist in the ejection of battery cell during the thermal event. In an alternate embodiment, Shape Memory Alloy (SMA) can be included between the battery cell and the PCB to further assist in the ejection of battery cell during the thermal event.

In one embodiment, the containment compartment includes retractable doors utilizing helical spring mechanisms with a stopper to allow for limited rotation as the retractable doors are opened due to the force applied by the ejected battery cell experiencing free fall. In another embodiment, the containment compartment includes slanted members in a cavity of the containment compartment, where the slanted members are designed to meet the 5-degree projection angle requirements for fire enclosures specified in safety standards—IEC 60950 for containing a potential explosive event. The slanted members eliminate a linear path from the ejected battery cell located at the bottom of the cavity to the exterior of the containment compartment.

Detailed embodiments of the present invention are disclosed herein with reference to the accompanying drawings; however, it is to be understood that the disclosed embodiments are merely illustrative of potential embodiments of the invention and may take various forms. In addition, each of the examples given in connection with the various embodiments is also intended to be illustrative, and not restrictive. This description is intended to be interpreted merely as a representative basis for teaching one skilled in the art to variously employ the various aspects of the present disclosure. In the description, details of well-known features and techniques may be omitted to avoid unnecessarily obscuring the presented embodiments.

For purposes of the description hereinafter, terms such as "upper", "lower", "right", "left", "vertical", "horizontal", "top", "bottom", and derivatives thereof shall relate to the disclosed structures and methods, as oriented in the drawing figures. Terms such as "above", "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements. The term substantially, or substantially similar, refer to instances in which the difference in length, height, or orientation convey no practical difference between the definite recitation (e.g. the phrase sans the substantially similar term), and the substantially similar variations. In one embodiment, substantial (and its derivatives) denote a difference by a generally accepted engineering or manufacturing tolerance for similar devices, up to, for example, 10% deviation in value or 10° deviation in angle.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Many common fabrication techniques involve securing two objects using an adhesive layer between the objects. Often times the adhesive layer is chosen in an attempt to permanently secure the two objects together. And while this adhesive layer selection may be advantageous for typical usage of the overall product, there may be instances where separation of the joined objects is either desired, or necessary. In such instances, separation of the two objects, without physically damaging either of the objects, may be required so that one or both of the objects may be reused.

FIG. 1 depicts a battery cell circuit board assembly with containment compartments and cooling fans situated within an enclosure, in accordance with an embodiment of the present invention. In this embodiment, battery cell package 100 includes enclosure 102 with encased battery cell circuit board assembly 104 and multiple battery cells 106. Each battery cell 106 is electrically coupled to a lower surface of circuit board assembly 104, where the multiple battery cells 106 are suspended in an inverted position above multiple containment compartments 108. Battery cell 106 represents an electrical power storage component, such as a lithium-ion cell, capable of providing electrical power to another system external to enclosure 102. In this embodiment, battery cell circuit board assembly 102 is a single printed circuit board (PCB) spanning the length of enclosure 102 for mounting and managing battery cells 106. In another embodiment, battery cell circuit board assembly 102 comprises multiple PCBs, where a portion of the battery cells 106 are mounted and managed by a portion of battery cell circuit board assembly 102.

Battery cell circuit board assembly 104 is inverted inside enclosure 102, where an upper surface of battery cell circuit board assembly 104 is mechanically coupled to an upper interior surface of enclosure 102. The multiple containment compartments 108 are situated on a lower interior surface of enclosure 102, where a single battery cell 106 aligns with a single containment compartment 108. The multiple containment compartments 108 is designed to meet the 5-degree projection angle requirements for fire enclosures specified in safety standards—IEC 60950 for containing a potential explosive event. Fans 110 are positioned at a first end of enclosure 102 to provide cooling to battery cell circuit board assembly 104 and multiple battery cells 106. Fans 110 draw air through vents 112 on inlet side 114 of enclosure 102, where fans 110 accelerate air towards battery cell circuit board assembly 104 and multiple battery cells 106. Outlet side 116 of enclosure 102 includes exhausting vents (not illustrated in FIG. 1) for ventilating heated air away from enclosure 102.

Figure 2:
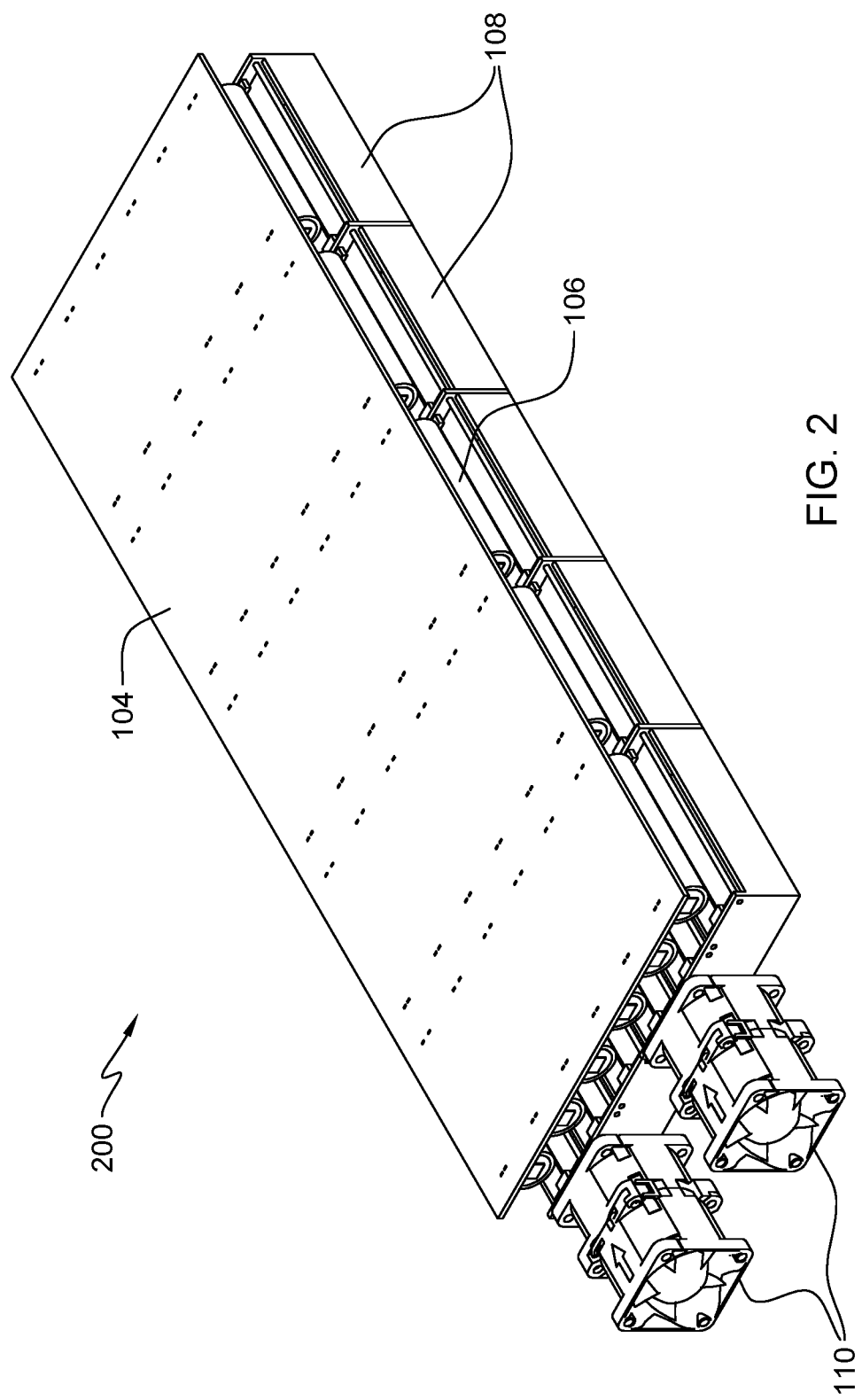
FIG. 2 depicts the battery cell circuit board assembly with containment compartments and cooling fans of FIG. 1 with the enclosure removed, in accordance with an embodiment of the present invention.

FIG. 2 depicts the battery cell circuit board assembly with containment compartments and cooling fans of FIG. 1 with the enclosure removed, in accordance with an embodiment of the present invention. In this embodiment, exposed battery cell package 200 includes encased battery cell circuit board assembly 104 and multiple battery cells 106, where enclosure 102 is removed. The orientation of battery cell circuit board assembly 104 relative to containment compartments 108 and fans 110 of exposed battery cell package 200 is equivalent to the orientation found on battery cell package 100 in FIG. 1. In this embodiment, fans 110 are situated at a first end of battery cell circuit board assembly 104 directing airflow in parallel to the rows of battery cells 106. In another embodiment, fans 110 are situated at a first side of battery cell circuit board assembly 104 directing airflow perpendicular to the rows of battery cells 106. A location and orientation of fans 110 is based on the cooling requirements for one or more of battery cell circuit board assembly 104, battery cells 106, and containment compartments 108.

Figure 3:
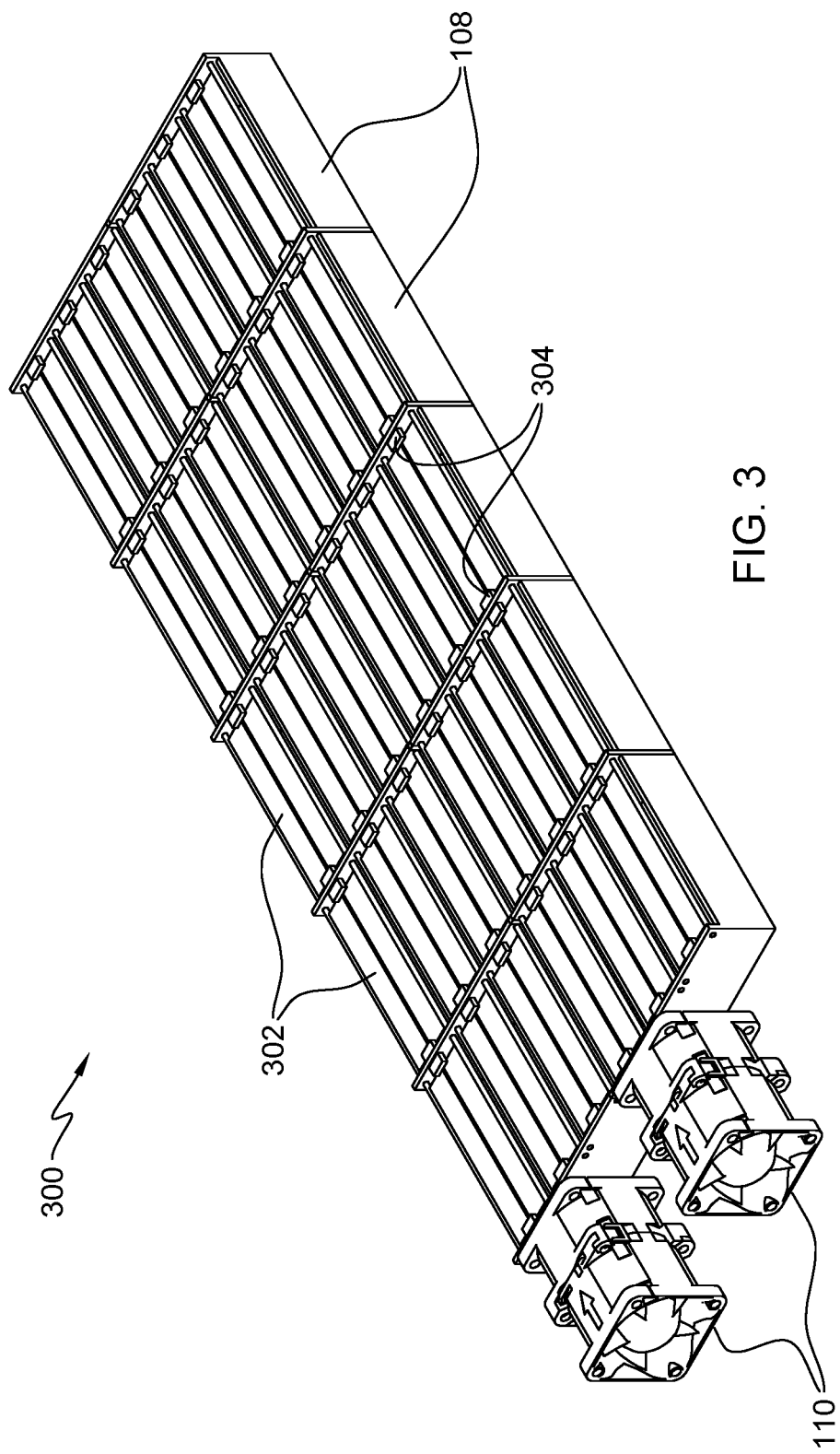
FIG. 3 depicts the containment compartments and cooling fans of FIG. 2 with the battery cell circuit board assembly removed, in accordance with one embodiment of the present invention.

FIG. 3 depicts the containment compartments and cooling fans of FIG. 2 with the battery cell circuit board assembly removed, in accordance with one embodiment of the present invention. In this embodiment, containment compartment package 300 includes multiple battery cells 106 and containment compartments 108, where enclosure 102 and battery cell circuit board assembly 104 are removed. Containment compartments 108 are arranged in a 5×6 configuration, where a single containment compartment 108 corresponds to a single battery cell 106 electrically coupled to battery cell circuit board assembly 104. The configuration of containment compartments 108 is dependent on the configuration of battery cells 106 on battery cell circuit board assembly 104. In another embodiment, two or more battery cells 106 can include a single designated containment compartment 108.

In this embodiment, each containment compartment 108 includes a set of containment doors 302 for sealing battery cell 106 within containment compartment 108 during a thermal event. In another embodiment, there is a single containment door 302 for each containment compartment 108. Each containment door 302 is hinged and spring loaded on one side of the containment compartment 108. For discussion purpose, the spring mechanism includes a spring bias for when containment doors 302 are in a closed position (i.e., 0 degrees), as illustrated in FIG. 3. A force applied to a top surface of the containment door 302 (i.e., battery cell 106 experiencing freefall) causes containment door 302 to pivot about the hinge into an open position (i.e., 0 degrees<x≤90 degrees), as a spring mechanism is compressed due to the applied force. Once the force is no longer present (i.e., battery cell 106 located in containment compartment 108), the spring mechanism expands causing containment door 302 to pivot about the hinge into the closed position. Each containment compartment 108 includes stopping point 304, such as a protruding member, to prevent containment door 302 from pivoting beyond a certain point when in the closed portion (i.e., 0 degrees).

Figure 4:
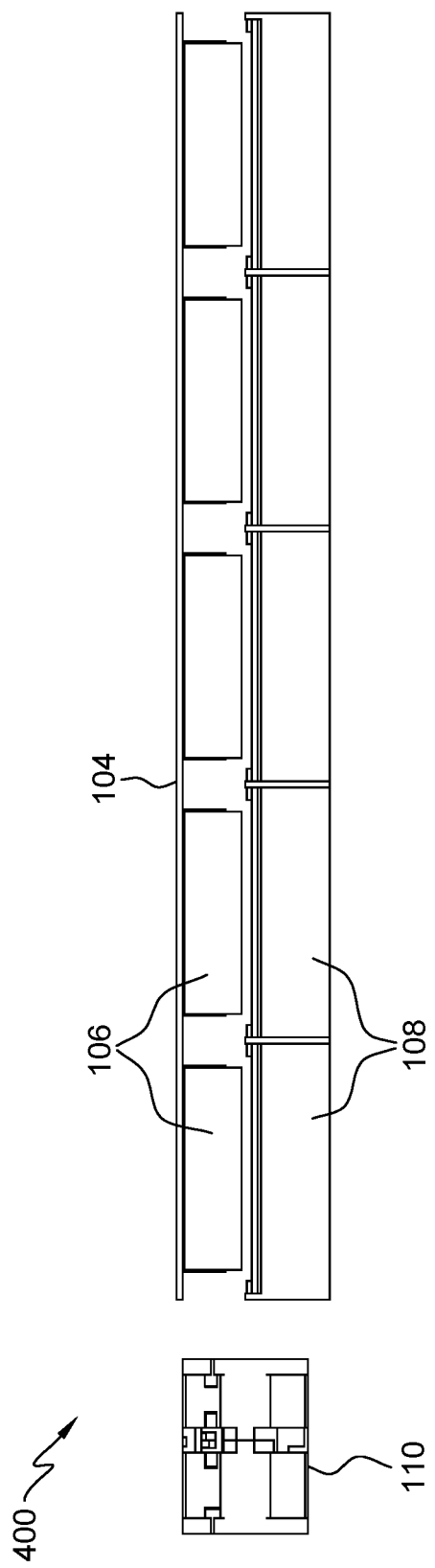
FIG. 4 depicts a side view of the battery cell circuit board assembly with containment compartments and cooling fans of FIG. 2, in accordance with one embodiment of the present invention.

FIG. 4 depicts a side view of the battery cell circuit board assembly with containment compartments and cooling fans of FIG. 2, in accordance with one embodiment of the present invention. In this embodiment, side view battery cell package 400 includes battery cell circuit board assembly 104, multiple battery cells 106, multiple containment compartments 108, and multiple fans 110, where enclosure 102 is removed. A length and height of battery cell 106 is less than a length and height of a corresponding containment compartment 108 to ensure that battery cell 106 can fit within the bounds of containment compartment 108 when ejected from battery cell circuit board assembly 104 and that containment doors 302 have space to close. A volume of containment compartment 108 can be dependent on a volume of battery cell 106 and a volume of battery cell 106 experiencing thermal expansion due to a thermal event. For example, a volume of containment compartment 108 is 40% greater than a volume of battery cell 106 to account for an amount of thermal expansion possible prior to the ejection of battery cell 106. In another embodiment, a partition wall comprising of a thermally conductive and mechanically durable material (e.g., aluminum and/or ceramic) is coupled to battery cell circuit board assembly 104 between two battery cells 106 to guide each battery cell 106 during an ejection from battery cell circuit board assembly 104. The partition walls can further isolate each battery cell 104 to minimize the effects of a thermal event.

Figure 5:
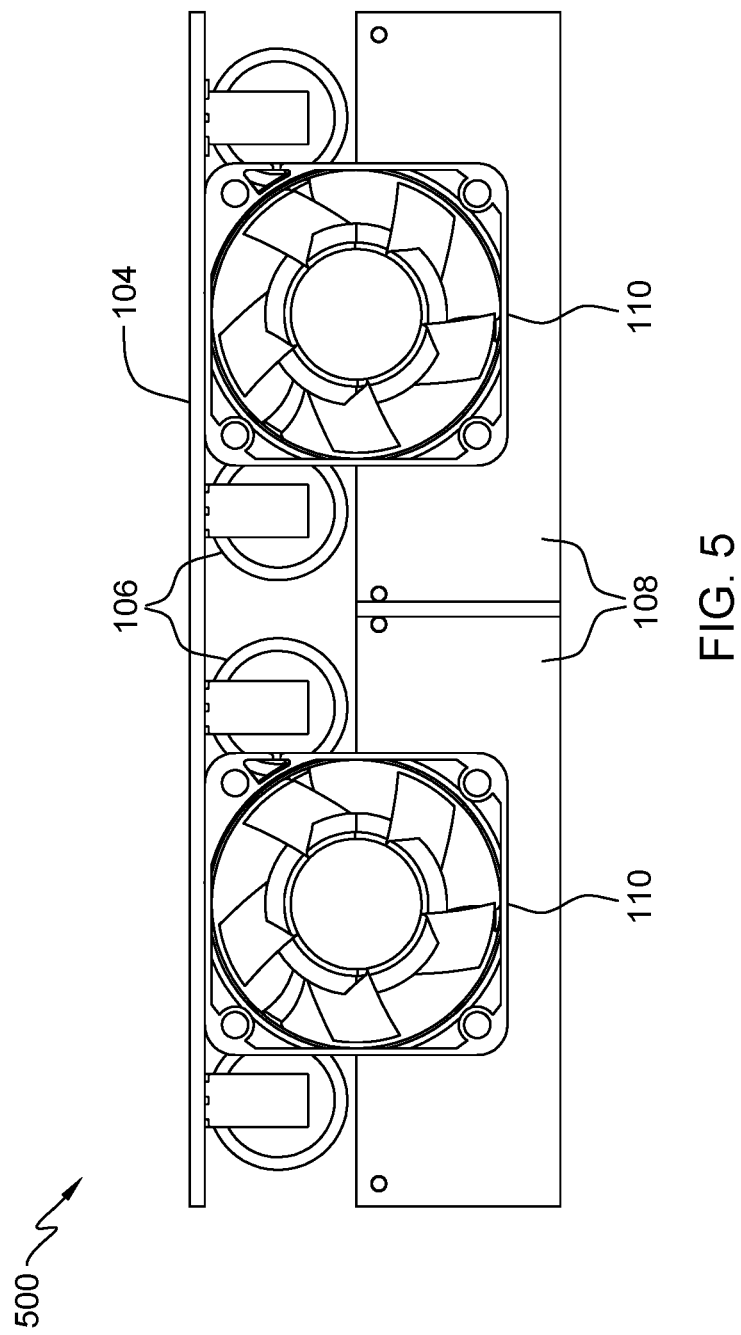
FIG. 5 depicts a front view of the battery cell circuit board assembly with containment compartments and cooling fans of FIG. 2, in accordance with one embodiment of the present invention.

FIG. 5 depicts a front view of the battery cell circuit board assembly with battery cells, containment compartments and cooling fans of FIG. 2, in accordance with one embodiment of the present invention. In this embodiment, front view battery cell package 500 includes battery cell circuit board assembly 104, multiple battery cells 106, multiple containment compartments 108, and multiple fans 110, where enclosure 102 is removed. The orientation, size, and number of fans 110 is dependent on cooling requirements of battery cell circuit board assembly 104 and battery cells 106. The parallel arrangement of the rows of battery cells 106 and a direction of air accelerated by fans 110 allows for cooled air to pass between the rows of battery cells 104 and exhausted out the rear of the battery cell circuit board assembly 104.

Figure 6:
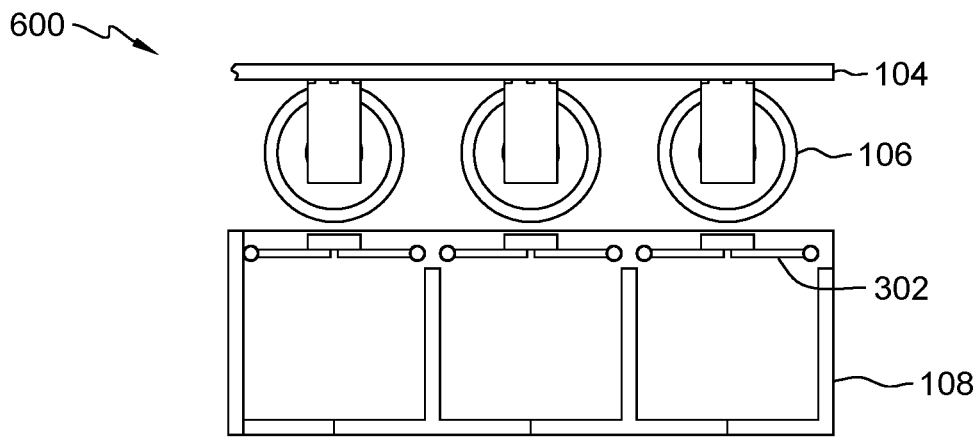
FIG. 6 depicts multiple battery cells electrically coupled to the battery cell circuit board assembly disposed above multiple containment compartments, in accordance with one embodiment of the present invention.

FIG. 6 depicts multiple battery cells electrically coupled to the battery cell circuit board assembly disposed above multiple containment compartments, in accordance with one embodiment of the present invention. In this embodiment, steady state battery cell package 600 includes multiple battery cells 106 electrically coupled to battery cell circuit board assembly 104 during normal operational conditions, where no battery cell 106 is experiencing a thermal event which would trigger battery cell 106 ejection. The proximity of containment doors 302 of containment compartment 108 to battery cells 106 ensures that when the thermal event occurs, battery cell 106 can be successfully ejected and free fall into containment compartment 108. Each containment compartment 108 is isolated and insulated with a thermally conductive and mechanically durable material (e.g., aluminum and/or ceramic) to prevent propagation of a thermal event from spreading to surrounding battery cells 106 and containment compartments 108.

Figure 7:
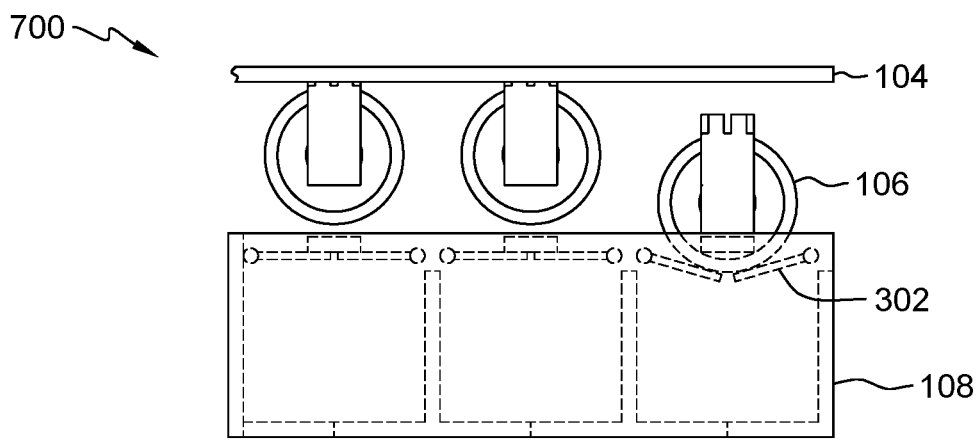
FIG. 7 depicts a single battery cell from the multiple battery cells electrically coupled to the battery cell circuit board assembly of FIG. 6 experiencing a decoupling event, in accordance with one embodiment of the present invention.

FIG. 7 depicts a single battery cell from the multiple battery cells electrically coupled to the battery cell circuit board assembly of FIG. 6 experiencing a decoupling event, in accordance with one embodiment of the present invention. In this embodiment, triggered state battery cell package 700 includes battery cells 106 electrically coupled to battery cell circuit board assembly 104, where a single battery cell 106 is experiencing a thermal event which triggered an ejection from battery cell circuit board assembly 104. As the electrical and mechanical connection between the single battery cell 106 is broken from the battery cell circuit board assembly 104, no further structure is present to prevent free fall of the single battery cell 106. As a result, gravity allows for the single battery cell 106 to free fall and contact containment doors 302 of containment compartment 108. The weight and momentum of the single battery cell 106 in free fall allows for the spring mechanism in each of the hinges of containment door 302 to compress, allowing for containment door 302 to open a cavity into which the single battery cell 106 can fall into (i.e., containment compartment 108).

Figure 8:
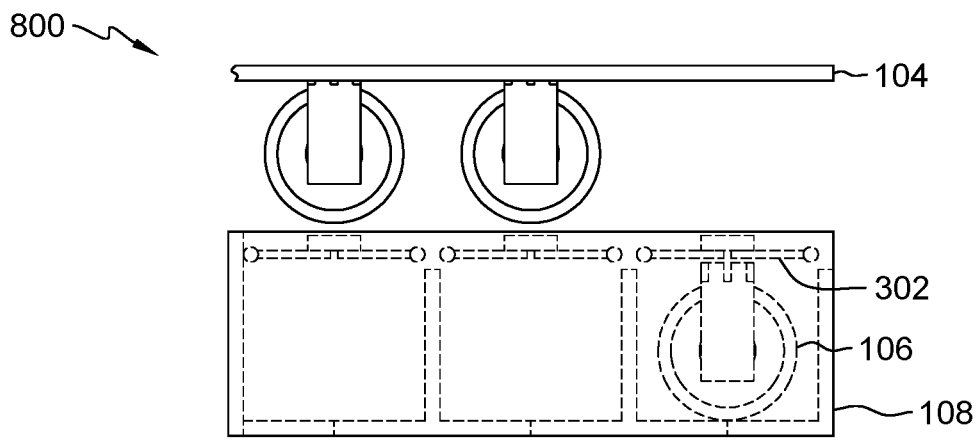
FIG. 8 depicts the single battery cell of FIG. 7 experiencing the decoupling event disposed in a single containment compartment from the multiple containment compartments, in accordance with one embodiment of the present invention.

FIG. 8 depicts the single battery cell of FIG. 7 experiencing the decoupling event disposed in a single containment compartment from the multiple containment compartments, in accordance with one embodiment of the present invention. In this embodiment, containment state battery cell package 800 includes battery cells 106 electrically coupled to battery cell circuit board assembly 104, where a single battery cell 106 experiencing the thermal event was ejected from battery cell circuit board assembly 104 and contained within containment compartment 108. A final resting position for battery cell 106 is illustrated in FIG. 8, where battery cell 106 is isolated and contained by the bounds of containment compartment 108 and containment doors 302. Since each containment door 302 includes the spring mechanism in each hinge, containment doors 302 spring back to the closed position once battery cell 106 lands in the final resting position within containment compartment 108. In one embodiment, containment doors 302 are monitored by one or more embedded sensors, where the one or more embedded sensors indicate when containment door 302 opens (i.e., ejection of battery cell 106) and when containment doors 302 close (i.e., final resting position of battery cell 106). Additionally, the one or more embedded sensors are associated with a particular battery cell 106 and containment compartment 108 pair, allowing for rapid identification of the particular battery cell 106 experiencing a thermal event and ejection from battery cell circuit board assembly 104.

Figure 9:
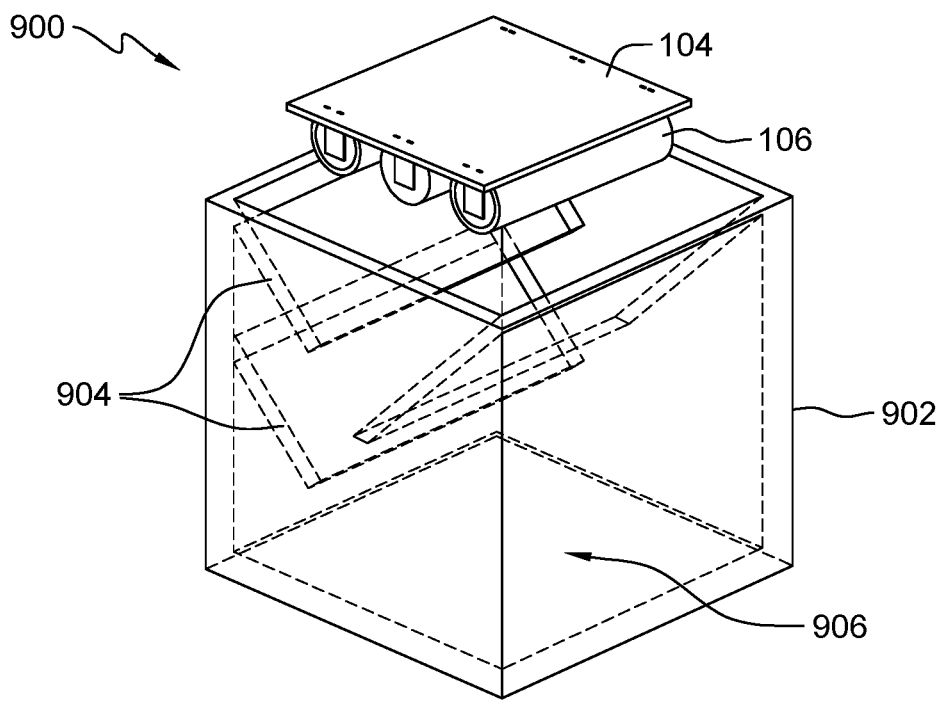
FIG. 9 depicts multiple battery cells electrically coupled to the battery cell circuit board assembly disposed above a slanted member containment compartment, in accordance with one embodiment of the present invention.

FIG. 9 depicts multiple battery cells electrically coupled to the battery cell circuit board assembly disposed above a slanted member containment compartment, in accordance with one embodiment of the present invention. In this embodiment, steady state battery cell package 900 includes battery cells 106 electrically coupled to battery cell circuit board assembly 104 during normal operational condition, where no battery cell 106 is experiencing a thermal event which would trigger battery cell 106 ejection. Slanted member containment compartment 902 includes slanted members 904, where containment cavity 906 within slanted member containment compartment 902 is capable of housing three battery cells 106 experiencing a thermal event. A volume of containment cavity 906 is dependent on a number of battery cells 106 assigned to slanted member containment compartment 902, where containment cavity 906 has the ability to enclose the number of battery cells 106 assigned to slanted member containment compartment 902. Containment cavity 906 is partially enclosed by the combination of the walls of slanted member containment compartment 902 and slanted members 904 to prevent damage to surrounding areas if a thermal event (i.e., explosive burst) of battery cell 106 occurs in containment cavity 906. Slanted members 904 are designed to meet the 5-degree projection angle requirements for fire enclosures specified in safety standard IEC60950 for containing a potential thermal event, where there is no linear path from when battery cell 106 is situated in containment cavity 906 of slanted member containment compartment 902. A number and size of slanted members 904 is dependent on the thermal event containment requirements for the number of battery cells assigned to each slanted member containment compartment 902. Slanted members 904 are to withstand a thermal event experienced by battery cell 106, such as explosive bursts, without propagating to surrounding slanted member containment compartment 902. Slanted member containment compartment 902 and slanted members 904 are constructed utilizing a thermally conductive and mechanically durable material (e.g., aluminum and/or ceramic).

Figure 10:
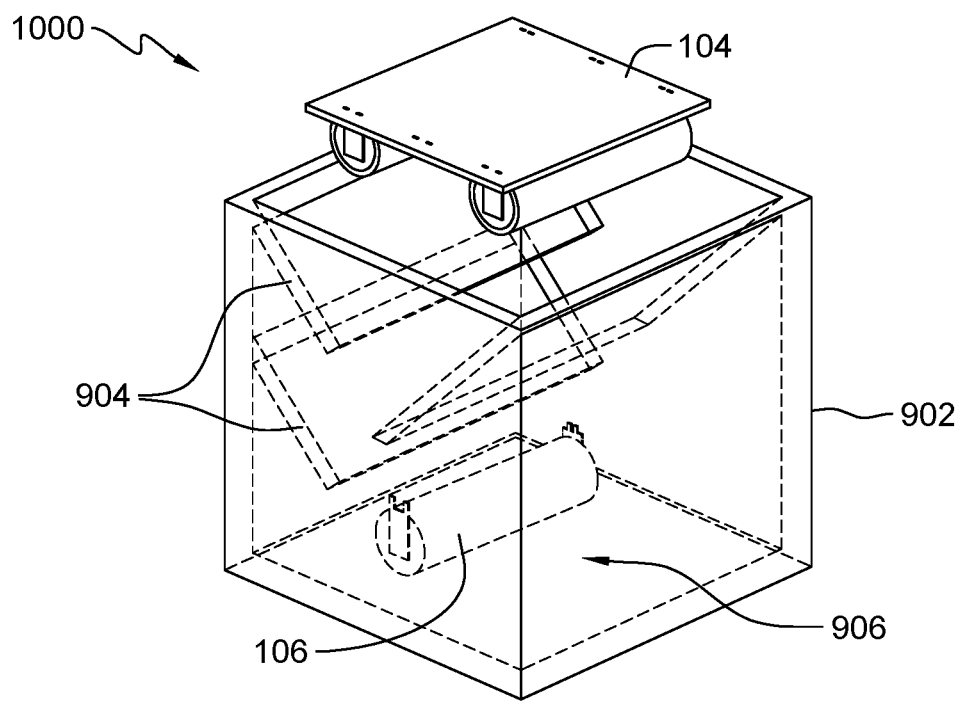
FIG. 10 depicts a single battery cell of FIG. 9 experiencing a decoupling event disposed in the slanted member containment compartment, in accordance with one embodiment of the present invention.

FIG. 10 depicts a single battery cell of FIG. 9 experiencing a decoupling event disposed in the slanted member containment compartment, in accordance with one embodiment of the present invention. In this embodiment, containment state battery cell package 1000 includes battery cells 106 electrically coupled to battery cell circuit board assembly 104, where a single battery cell 106 is experiencing a thermal event that resulted in the ejection of the single battery cell 106 from battery cell circuit board assembly 104 into containment cavity 906 of slanted member containment compartment 902. A final resting position is illustrated in FIG. 10, where battery cell 106 is isolated and contained by the bounds of slanted member containment compartment 902 and slanted members 904. As the single battery cell 106 is ejected from battery cell circuit board assembly 104, each of slanted members 904 guide the ejected battery cell 106 towards containment cavity 906.

Figure 11:
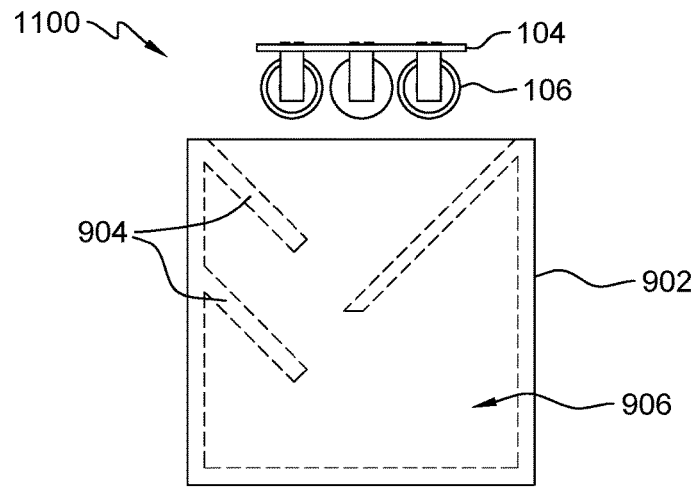
FIG. 11 depicts a side view of multiple battery cells electrically coupled to the battery cell circuit board assembly disposed above a slanted member containment compartment, in accordance with one embodiment of the present invention.

FIG. 11 depicts a side view of multiple battery cells electrically coupled to the battery cell circuit board assembly disposed above a slanted member containment compartment, in accordance with one embodiment of the present invention. In this embodiment, side view steady state 1100 includes multiple battery cells 106 electrically coupled to battery cell circuit board assembly 104 during normal operational conditions above slanted member containment compartment 902, where no battery cell 106 is experiencing a thermal event which would trigger battery cell 106 ejection. As illustrated in FIG. 11, slanted members 904 are orientated such that there is no linear path from battery cell circuit board assembly 104 with multiple battery cells 106 to containment cavity 906 of slanted member containment compartment 902.

Figure 12:
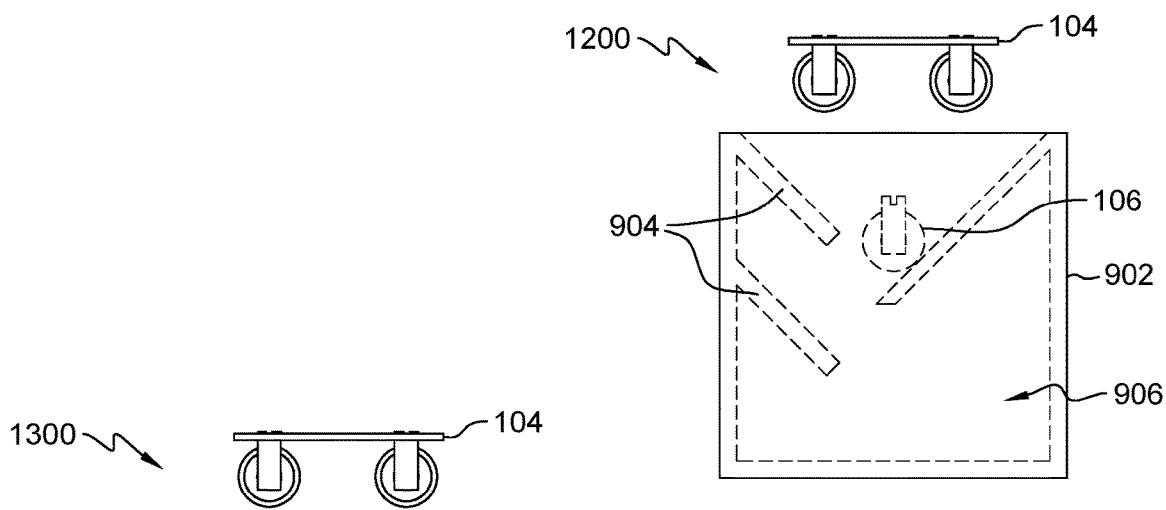
FIG. 12 depicts a side view of a single battery cell from the multiple battery cells electrically coupled to the battery cell circuit board assembly of FIG. 11 experiencing a decoupling event, in accordance with one embodiment of the present invention.

FIG. 12 depicts a side view of a single battery cell from the multiple battery cells electrically coupled to the battery cell circuit board assembly of FIG. 11 experiencing a decoupling event, in accordance with one embodiment of the present invention. In this embodiment, side view triggered event 1200 includes battery cells 106 electrically coupled to battery cell circuit board assembly 104 above slanted member containment compartment 902, where a single battery cell 106 is experiencing a thermal event which triggered an ejection from battery cell circuit board assembly 104. As the electrical and mechanical connection between the single battery cell 106 and battery cell circuit board assembly 104 is broken, no further structure is present to prevent free fall of the single battery cell 106. As a result, gravity allows for the single battery cell 106 to free fall and contact at least one slanted member 904 of slanted member containment compartment 902. The weight and momentum of the single battery cell 106 in free fall, in conjunction with the angle of each slanted member 904, allows for the single battery cell 106 to fall in steps towards containment cavity 906.

Figure 13:
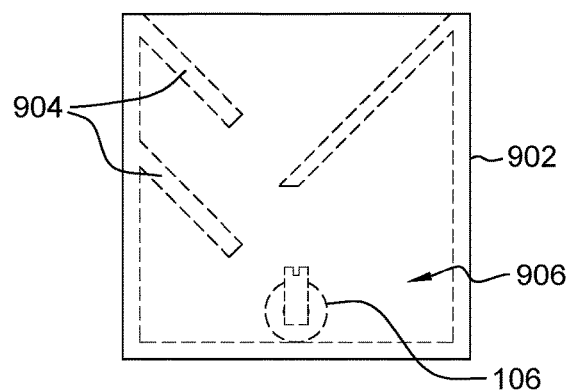
FIG. 13 depicts a side view of the single battery cell of FIG. 12 experiencing the decoupling event disposed in the slanted member containment compartment, in accordance with one embodiment of the present invention.

FIG. 13 depicts a side view of the single battery cell of FIG. 12 experiencing the decoupling event disposed in the slanted member containment compartment, in accordance with one embodiment of the present invention. In this embodiment, side view containment state 1300 includes battery cells 106 electrically coupled to battery cell circuit board assembly 104, where a single battery cell 106 experiencing the thermal event was ejected from battery cell circuit board assembly 104 and contained within slanted member containment compartment 902. A final resting position for battery cell 106 is illustrated in FIG. 13, where battery cell 106 is isolated and contained by the bounds of slanted member containment compartment 902 and slanted members 904.

In another embodiment, slanted member containment cavity 906 is located external to enclosure 102, where enclosure 102 includes battery cell circuit board assembly 104 and multiple battery cells 106. Slanted member containment cavity 906 can be mounted within the side cheek of a server computer rack such that slanted member containment cavity 906 is further away from components, providing greater protection to battery cell circuit board assembly 104 and battery cells 106 when a single battery cell 106 experiences a thermal event as well as minimizing the height of enclosure 106 which is beneficial due to the limited space for other components within the server computer rack. Slanted members 904 can be part of enclosure 102 or sit below enclosure 102 to guide the single battery cell 106 to containment cavity 906.

Figure 14:
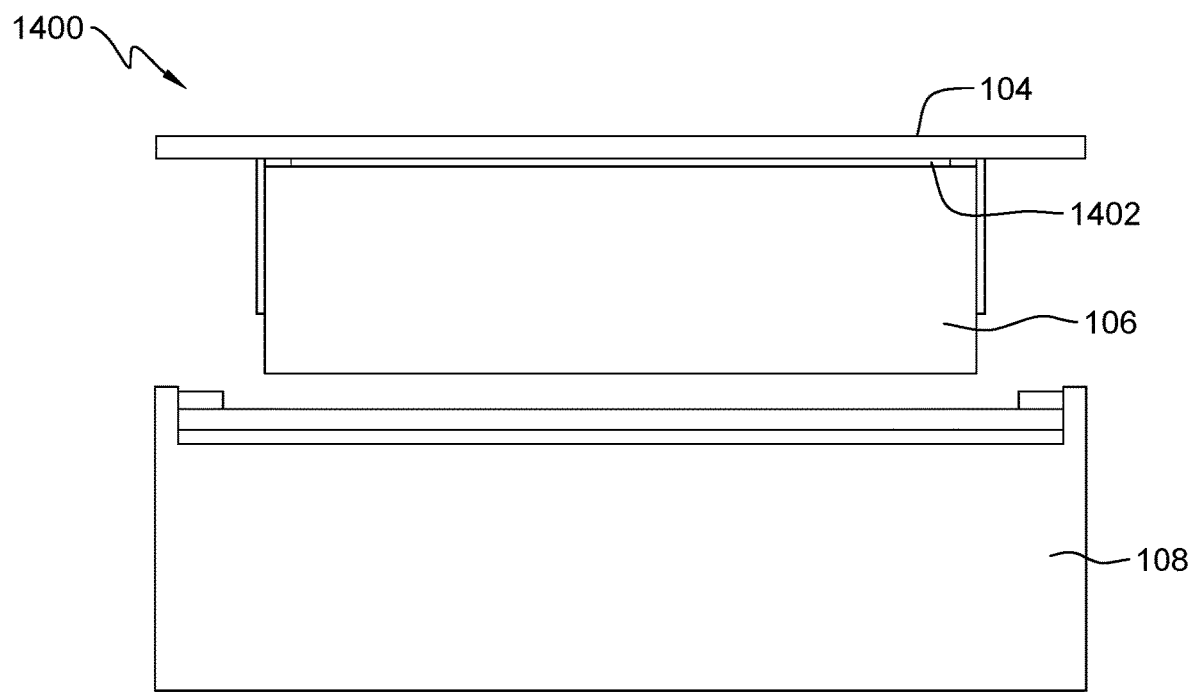
FIG. 14 depicts a side view of a single battery cell electrically coupled to the battery cell circuit board assembly via intumescent material disposed over a single containment compartment, in accordance with one embodiment of the present invention.

FIG. 14 depicts a side view of a single battery cell electrically coupled to the battery cell circuit board assembly with intumescent material disposed between over a single containment compartment, in accordance with one embodiment of the present invention. In this embodiment, retracted state 1400 includes one or more heating pads and intumescent material 1402 disposed between battery cell 106 and battery circuit assembly 104 situated above containment compartment 108. The one or more heating pads can be embedded into intumescent material 1402 or the one or more heating pads can be disposed between intumescent material 1402 and battery cell circuit board assembly 104. Each battery cell 106 includes a dedicated voltage sensor and temperature sensor, where a failure of battery cell 106 is detected by an increase in temperature or a change in voltage measured by the sensors. When a temperature of a single battery cell 106 is approaching a melting point of low temperature solder, heating pad is activated resulting in the expansion of intumescent material 1402. As intumescent material 1402 expands, the electrical and structural connection between battery cell circuit board assembly 104 and battery cell 106 is broken, resulting in battery cell 104 free falling into containment compartment 108. The intumescent material 1402 may assist in pushing the battery cell 106 away from battery cell circuit board assembly 104 if the low temperature solder connection is not fully broken on connection point on either side of battery cell 106. The one or more heating pads may be optional as the intumescent material 1402 can expand due to the increase in cell temperature without the requirement of the one or more heating pads or in response to the one or more heating pads malfunctioning. In the event of an explosive burst, the intumescent material 1402 may also assist in the containment of fire and toxic gases.

Figure 15:
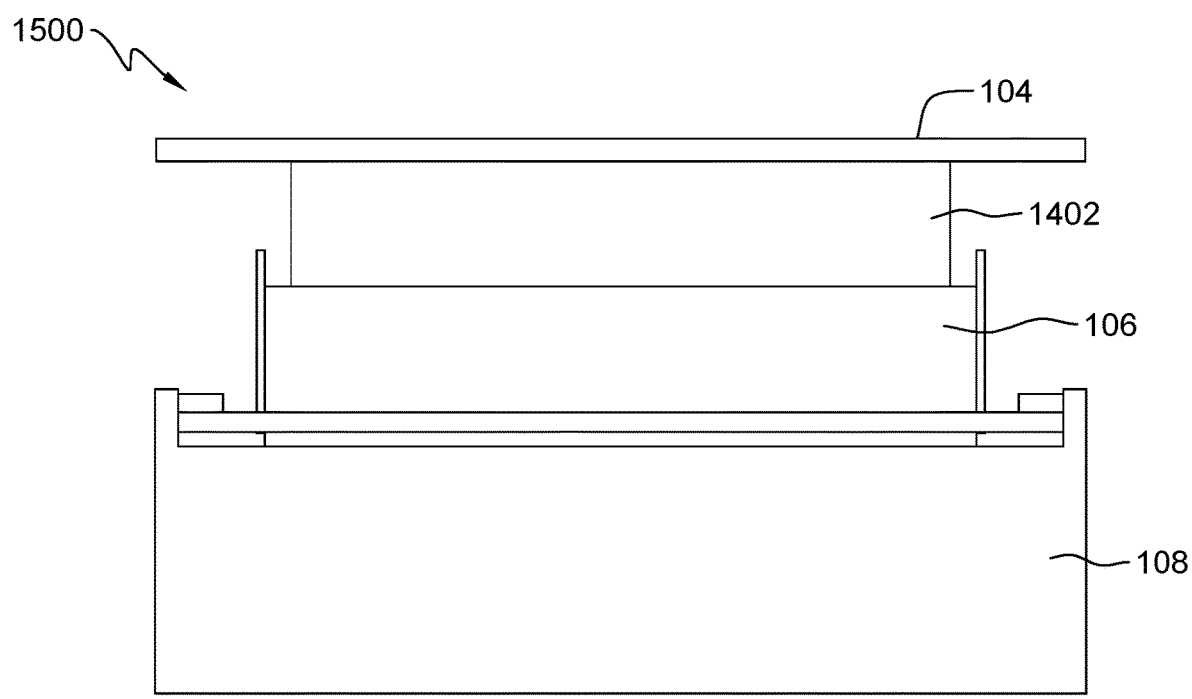
FIG. 15 depicts a side view of the single battery cell electrically coupled to the battery cell circuit board assembly via intumescent material of FIG. 14 experiencing a decoupling event, in accordance with one embodiment of the present invention.

FIG. 15 depicts a side view of the single battery cell electrically coupled to the battery cell circuit board assembly with intumescent material disposed between of FIG. 14 experiencing a decoupling event, in accordance with one embodiment of the present invention. In this embodiment, expanded state 1500 includes one or more heating pads and intumescent material 1402 disposed between battery cell 106 and battery cell circuit board assembly 104 situated above containment compartment 108, where intumescent material 1402 was activated and expanded. As the temperature of battery cell 106 increases, the low temperature solder providing the electrical and structural connection between battery cell circuit board assembly 104 and battery cell 106 weakens. Concurrently, the one or more heating pads are activated causing intumescent material 1402 to expand breaking the connection of the low temperature solder. Since battery cell 106 is not structurally coupled to intumescent material 1402, battery cell 106 is pushed by intumescent material and/or free falls into containment compartment 108. The features of containment compartment 108 were previously discussed with regards to FIG. 1. In another embodiment, battery cell 106 is pushed by intumescent material and/or free falls into slanted member containment compartment 902, where features of slanted member containment compartment 902 were previously discussed with regards to FIG. 9. In yet another embodiment, Shape Memory Alloy (SMA) is utilized between battery cell 106 and battery cell circuit board assembly 104 to further assist in the ejection of battery cell during the thermal event.

The terminology used herein is for the purpose of describing particular embodiments only and is not intended to be limiting to the invention. As used herein, the singular forms "a", "an" and "the" are intended to include the plural forms as well, unless the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein. It is therefore intended that the present invention not be limited to the exact forms and details described and illustrated but fall within the scope of the appended claims.

Figure 16:
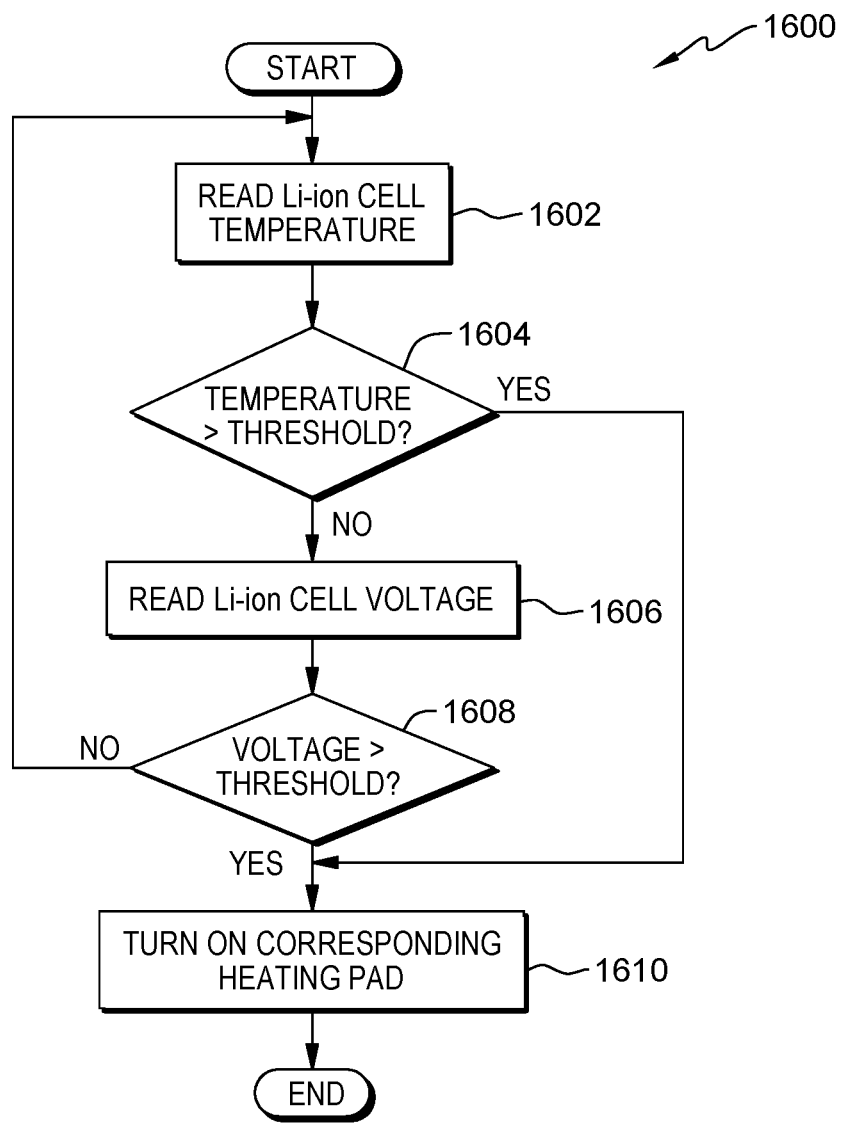
FIG. 16 is a flowchart depicting operational steps of a battery cell containment program for decoupling a battery cell during a thermal event utilizing intumescent material, in accordance with one embodiment of the present invention.

FIG. 16 is a flowchart depicting operational steps of a battery cell containment program for decoupling a battery cell during a thermal event utilizing intumescent material, in accordance with one embodiment of the present invention. Battery cell containment program 1600 utilizes a combination of temperature sensors and voltage sensors associated with each battery cell 106 to managed intumescent material 1402 disposed between each battery cell 106 and battery cell circuit board assembly 104. In this embodiment, battery cell containment program 1600 reads lithium-ion battery cell 106 temperatures (1602) by querying one or more temperature sensors associated with each lithium-ion battery cell 106 for one or more temperature values associated with each lithium-ion battery cell 106. Each lithium-ion battery cell 106 can include one or more temperature sensors located at different points of an exterior surface of lithium-ion battery cell 106 to detect variations in temperatures along the exterior surface of a single lithium-ion battery cell 106.

Battery cell containment program 1600 determines whether the temperature reading for lithium-ion battery cell 106 exceeds a predetermined threshold temperature value (1604). In the event that battery cell containment program 1600 determines that the temperature reading for lithium-ion battery cell 106 has not exceeded the predetermined threshold temperature value ("no" branch, 1604), battery cell containment program 1600 reads lithium-ion battery cell 106 voltage (1606). In the event that battery cell containment program 1600 determines that the temperature reading for lithium-ion battery cell 106 has exceeded the predetermined threshold temperature value ("yes" branch, 1604), battery cell containment program 1600 turns on a corresponding heating pad for lithium-ion battery cell 106 experiencing a temperature reading exceeding the temperature threshold (1610).

Battery cell containment program 1600 reads lithium-ion battery cell 106 voltage (1606) by querying one or more voltage sensors associated with each lithium-ion battery cell 106 for one or more voltage values associated with each lithium-ion battery cell 106.

Battery cell containment program 1600 determines whether the voltage reading for lithium-ion battery cell 106 exceeds a predetermined threshold voltage value (1608). In the event that battery cell containment program 1600 determines that the voltage reading for lithium-ion battery cell 106 has not exceeded the predetermined threshold voltage value ("no" branch, 1608), battery cell containment program 1600 reverts and reads lithium-ion battery cell 106 temperatures (1602). In the event that battery cell containment program 1600 determines that the voltage reading for lithium-ion battery cell 106 has exceeded the predetermined threshold voltage value ("yes" branch, 1604), battery cell containment program 1600 turns on (i.e., activates) a corresponding heating pad for lithium-ion battery cell 106 experiencing a temperature reading exceeding the temperature threshold (1610). As a temperature for the heating pad increases, intumescent material expands while heat from lithium-ion battery cell 106 melts the low temperature solder holding it to battery cell circuit board assembly 104 to eject the lithium-ion battery cell 106 situated above containment compartment 108 or slanted member containment compartment 902. Subsequent to the ejection, the lithium-ion battery cell 106 free falls into containment compartment 108 or slanted member containment compartment 902 and battery cell containment program 1600 can send a notification to an administrative user identifying the ejected lithium-ion battery cell 106 and the temperature or voltage reading which exceeded the temperature value or the voltage value threshold.

Figure 17:
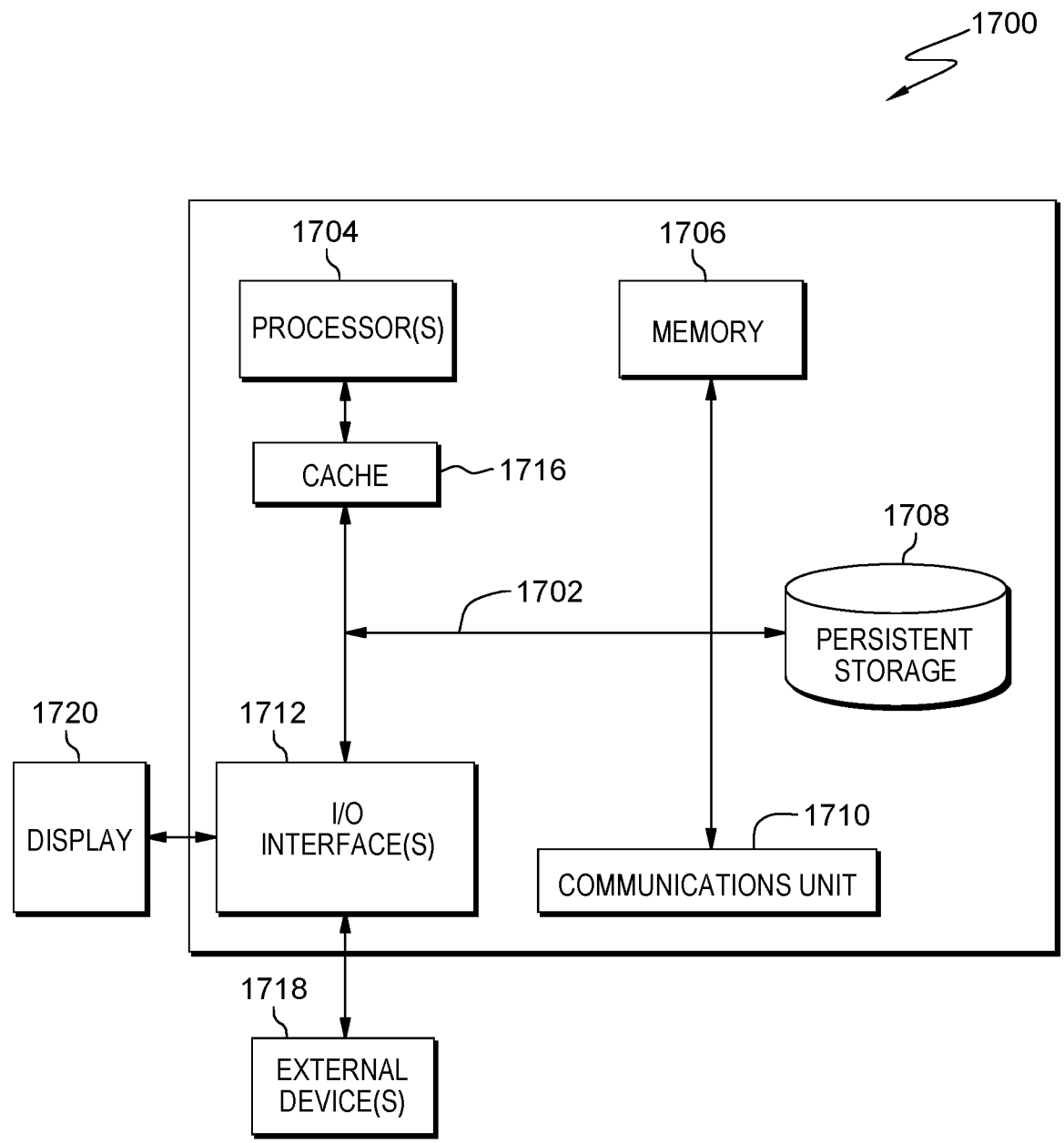
FIG. 17 depicts a block diagram of components of a computer system for performing the operational steps of the battery cell containment program, in an embodiment, in accordance with the present invention.

FIG. 17 depicts a block diagram of components of a computer system for performing the operational steps of the battery cell containment program, in an embodiment, in accordance with the present invention.

Computer system 1700, where embedded microcontroller 1704 is an example of a system that includes battery cell containment program 1600. The computer system includes processors 1704, cache 1716, memory 1706, persistent storage 1708, communications unit 1710, input/output (I/O) interface(s) 1712 and communications fabric 1702. Communications fabric 1702 provides communications between cache 1716, memory 1706, persistent storage 1708, communications unit 1710, and input/output (I/O) interface(s) 1712. Communications fabric 1702 can be implemented with any architecture designed for passing data and/or control information between processors (such as microprocessors, communications and network processors, etc.), system memory, peripheral devices, and any other hardware components within a system. For example, communications fabric 1702 can be implemented with one or more buses or a crossbar switch.

Memory 1706 and persistent storage 1708 are computer readable storage media. In this embodiment, memory 1702 includes random access memory (RAM). In general, memory 1706 can include any suitable volatile or non-volatile computer readable storage media. Cache 1716 is a fast memory that enhances the performance of processors 1704 by holding recently accessed data, and data near recently accessed data, from memory 1706.

Program instructions and data used to practice embodiments of the present invention may be stored in persistent storage 1708 and in memory 1706 for execution by one or more of the respective processors 1704 via cache 1716. In an embodiment, persistent storage 1708 includes a magnetic hard disk drive. Alternatively, or in addition to a magnetic hard disk drive, persistent storage 1708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 1708 may also be removable. For example, a removable hard drive may be used for persistent storage 1708. Other examples include optical and magnetic disks, thumb drives, and smart cards that are inserted into a drive for transfer onto another computer readable storage medium that is also part of persistent storage 1708.

Communications unit 1710, in these examples, provides for communications with other data processing systems or devices. In these examples, communications unit 1710 includes one or more network interface cards. Communications unit 1710 may provide communications through the use of either or both physical and wireless communications links. Program instructions and data used to practice embodiments of the present invention may be downloaded to persistent storage 1708 through communications unit 1710.

I/O interface(s) 1712 allows for input and output of data with other devices that may be connected to each computer system. For example, I/O interface 1706 may provide a connection to external devices 1718 such as a keyboard, keypad, a touch screen, and/or some other suitable input device. External devices 1718 can also include portable computer readable storage media such as, for example, thumb drives, portable optical or magnetic disks, and memory cards. Software and data used to practice embodiments of the present invention can be stored on such portable computer readable storage media and can be loaded onto persistent storage 1708 via I/O interface(s) 1712. I/O interface(s) 1712 also connect to display 1720.

Display 1720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An apparatus for containing packaged battery cells, the apparatus comprising:
   a battery cell package includes a printed circuit board, one or more battery cells, and one or more containment compartments, wherein each of the one or more battery cells are suspended from the printed circuit board in an inverted position;

each of the one or more battery cells is electrically and structurally coupled to the printed circuit board, wherein a solder connection electrically and structurally couples each of the one or more battery cells to the printed circuit board; and a cavity of each of the one or more containment compartment disposed below the each of the one or more battery cells, wherein a volume of the cavity of each of the one or more containment compartments is greater than a volume of the each of the one or more battery cells.

2. The apparatus of claim 1, further comprising:
a first edge of a first containment door hinged to a first edge of each of the one or more containment compartments; and
a first edge of a second containment door hinged to a second edge of each of the one or more containment compartments, wherein the first edge is opposite the second edge.

3. The apparatus of claim 2, wherein the cavity of each of the one or more containment compartments is enclosed by the first containment door, the second containment door, and a single containment compartment.

4. The apparatus of claim 2, further comprising:
a first spring mechanism coupled to the edge of the first containment door and the first edge of each of the one or more containment compartments; and
a second spring mechanism coupled to the edge of the second containment door and the second edge of each of the one or more containment compartments.

5. The apparatus of claim 4, wherein a weight of a single battery cell compresses the first spring mechanism and the second spring mechanism.

6. The apparatus of claim 2, wherein a portion of each of the one or more containment compartments is located on an exterior wall of the battery cell package.

7. The apparatus of claim 2, further comprising:
an intumescent medium disposed between each of the one or more battery cells and the printed circuit board.

8. The apparatus of claim 7 further comprising:
a heating pad disposed between the printed circuit board and the intumescent medium.

9. The apparatus of claim 2, wherein the solder becomes liquidous between 100 Celsius and 200 Celsius.

10. The apparatus of claim 2, wherein the cavity of each of the one or more containment compartments is aligned in parallel with each of the one or more battery cells and an area of an opening of the cavity of each of the one or more containment compartments is greater than a longitudinal cross section at a diameter of each of the one or more battery cells.

11. The apparatus of claim 1, wherein each of the one or more containment compartments further comprises:
two or more members in the cavity of each of the one or more containment compartments coupled to an interior side surface of the cavity of each of the one or more containment compartments.

12. The apparatus of claim 11, wherein the two or more members in the cavity of each of the one or more containment compartments are coupled such that no linear path exists between an interior bottom surface of the cavity and an opening of the cavity.

13. The apparatus of claim 12, wherein each of the two or more members in the cavity of each of the one or more containment compartments coupled to the interior side surface of the cavity are angled towards an interior bottom surface of the cavity.

14. The apparatus of claim 11, wherein a portion of each of the one or more containment compartments is located outside of the battery cell package.

15. The apparatus of claim 11, further comprising:
an intumescent medium disposed between each of the one or more battery cells and the printed circuit board.

16. The apparatus of claim 15, further comprising:
a heating pad disposed between the printed circuit board and the intumescent medium.

17. The apparatus of claim 11, wherein the solder becomes liquidous between 100 Celsius and 200 Celsius.

18. The apparatus of claim 11, wherein the cavity of each of the one or more containment compartments is aligned in parallel with each of the one or more battery cells and an area of an opening of the cavity of each of the one or more containment compartments is greater than a longitudinal cross section at a diameter of each of the one or more battery cells.

19. The apparatus of claim 1, wherein a cooling fan is disposed at a first end of the battery cell package.

* * * * *